United States Patent
Wilson

(10) Patent No.: US 7,128,471 B2
(45) Date of Patent: Oct. 31, 2006

(54) SINGLE-USE FIBER OPTIC CABLE

(75) Inventor: Robert E. Wilson, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/841,579

(22) Filed: May 6, 2004

(65) Prior Publication Data
US 2005/0249466 A1 Nov. 10, 2005

(51) Int. Cl.
G02B 6/36 (2006.01)

(52) U.S. Cl. ...................................... 385/78

(58) Field of Classification Search ........... 385/78–94
See application file for complete search history.

(56) References Cited

U.S. PATENT DOCUMENTS 5,013,124 A * 5/1991 Focht ........................ 385/56
5,574,813 A * 11/1996 Chudoba et al. ............ 385/81
6,321,006 B1 * 11/2001 Wu ............................ 385/28
6,331,081 B1 * 12/2001 Ohtsuka et al. ............. 385/85
6,371,661 B1 * 4/2002 Meadowcroft ............... 385/78
6,575,640 B1 * 6/2003 Connelly et al. ............ 385/69
6,604,867 B1 * 8/2003 Radek et al. ................ 385/81
6,652,155 B1 11/2003 Lampert
6,652,156 B1 11/2003 Shinagawa et al.
6,663,292 B1 12/2003 Shirakawa
6,848,838 B1 * 2/2005 Doss et al. .................. 385/81
2002/0094173 A1 7/2002 Bruland et al.
2003/0063869 A1 * 4/2003 Elkins et al. ................ 385/87
2003/0215190 A1 11/2003 Lampert et al.

* cited by examiner

Primary Examiner—Sung Pak
Assistant Examiner—Tina M. Wong

(57) ABSTRACT

A fiber optic cable assembly includes a cable and a connector body receiving the cable. The connector body has a ferrule receiving an unpolished fiber from the cable, wherein the fiber protrudes from a tip of the ferrule.

14 Claims, 4 Drawing Sheets

SINGLE-USE FIBER OPTIC CABLE

DESCRIPTION OF RELATED ART

Fiber optic (FO) cable assemblies typically are designed to be used in a variety of applications and an individual cable assembly is expected to last hundreds of cycles. The term "cable assembly" used herein indicates a fiber optic cable with one or more fibers and connectors installed on one or both ends. The FO cable assemblies are normally covered by industry standards, which assure the cable assemblies work well in a wide variety of applications and reliably over the life of the cable assemblies. As a result, the FO cable assemblies are often over-designed and overly expensive for some of their applications.

FIG. 1 illustrates a partially exploded view of a conventional duplex LC (Lucent connector) cable assembly 10. Typically, a fiber optic cable 12 is stripped of a jacket 14 and a buffer 16 to expose a bare fiber 18. Fiber 18 is inserted through and bonded to a free-floating ferrule 20, which is spring-loaded by a spring 22 inside a connector plug 24 mated to a duplex connector body 26. Note that the end face of ferrule 20 is highly polished to provide a proper physical contact (PC) surface that minimizes optical loss and back reflection when two fibers come into intimate physical contact. Producing this proper PC surface according to cable standards makes ferrule 20 an expensive part to manufacture.

Fiber 18 protruding from the ferrule tip is scribed and broken off. A crimp ring 28 is then slid onto connector body 26. Kevlar fibers from jacket 14 are feathered around the end of crimp ring 28. A crimp sleeve 30 then physically crimps the Kevlar fibers onto crimp ring 28. A strain relief boot 32 is then slid onto crimp sleeve 30.

The ferrule tip is then polished to provide the appropriate surface characteristics to fiber 18. The polished surface is inspected through a microscope for scratches, voids, and chips. Cable assembly 10 can also be connected to a light source and an optical power meter to check insertion loss and back reflection. If any result is unsatisfactory, the ferrule tip is polished again. These steps make cable assembly 10 an expensive part to manufacture.

For engagement and disengagement with a FO module, each connector plug 24 has a latching arm 34 with latching shoulders 36. Connector body 26 has a trigger 38 that simultaneously lower latching arms 34 of both connector plugs 24.

FIG. 2 illustrates a conventional FO module 40. FO module 40 has a nose 42 with two connector receptacles 44 for receiving connector plugs 24. When inserted into connector receptacles 44, latching shoulders 36 (FIG. 1) slide under and then spring up against receptacle shoulders 46 of latch openings 48. To remove cable assembly 10 from FO module 40, trigger 38 (FIG. 1) is depressed to simultaneously lower latching arms 34 (FIG. 1) and disengage latching shoulders 36 from receptacle shoulders 46.

As described above, conventional cable assembly 10 consists of many piece parts and a complex assembly process. Particularly, ferrule 20 with the proper PC surface is expensive to manufacturer. Furthermore, it is labor intensive to cleave fiber 18 and then polish the ferrule tip to ensure a proper surface finish for fiber 18. Thus, what is needed is a cable assembly with fewer parts and a simpler assembly process.

SUMMARY

In one embodiment of the invention, a fiber optic cable assembly includes a cable and a connector body receiving the cable. The connector body has a ferrule receiving an unpolished fiber from the cable, wherein the fiber protrudes from a tip of the ferrule.

BRIEF DESCRIPTION OF THE DRAWINGS

Use of the same reference numbers in different figures indicates similar or identical elements.

DETAILED DESCRIPTION

Figure 1:
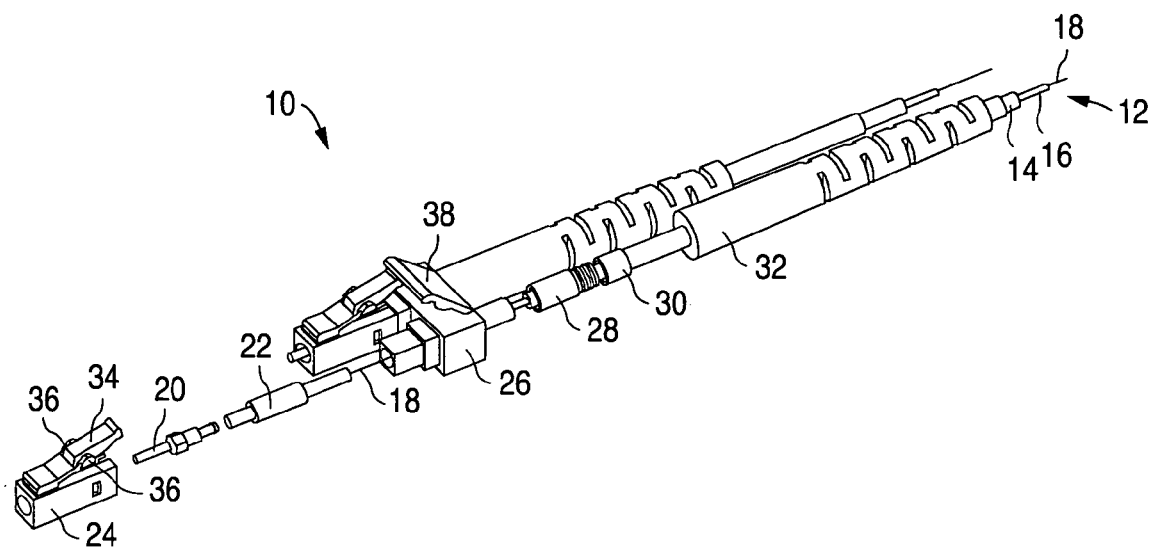
FIG. 1 illustrates a conventional duplex LC cable assembly.

Conventional duplex LC (Lucent connector) cable assembly 10 (FIG. 1) is designed to work in fiber-to-fiber connections as well as in fiber-to-module applications. It is also designed to work with multimode (MM) fibers with a core diameter of 50 µm and with single-mode (SM) fibers with a core diameter of 9 µm. The requirement for multiple applications results in a cable assembly with many piece parts and a complicated assembly process.

Figure 2:
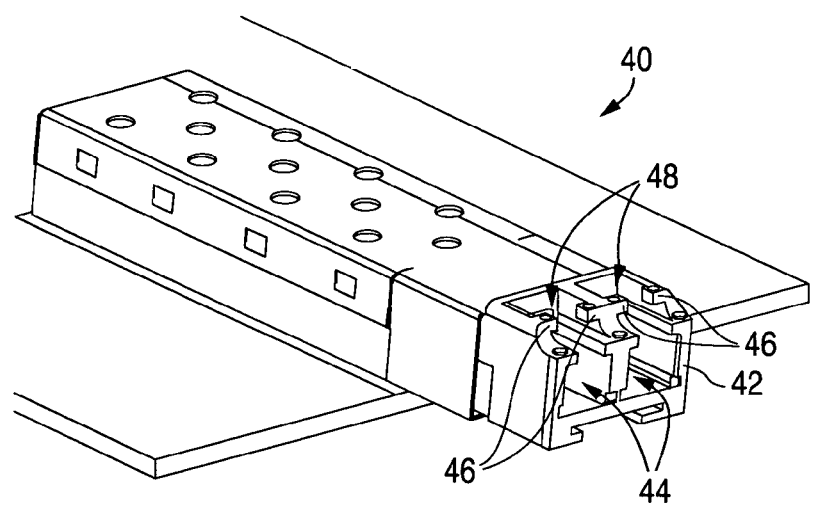
FIG. 2 illustrates a conventional fiber optic module.

There are ways to design a less expensive cable assembly but many concepts would compromise how well the connector works in one application or another. In particular, if the only requirement were connecting to a fiber optic (FO) module 40 (FIG. 2), it would not be necessary to have a polished fiber or a ferrule with a highly precise physical contact (PC) surface, which are both expensive and time-consuming to manufacturer. Further, it might be advantageous to use a fiber with a larger diameter core or a plastic fiber that is not supported in a connector standard (e.g., LC standard). A cable assembly that could not be removed from FO module 40 would make it possible to use the lowest cost piece parts for a given solution rather than the conventional cable assembly designed to work in the worse case scenario as required by the connector standard.

In addition, the cost of FO module 40 is impacted by the fact that currently the module needs to work with every possible cable assembly in the best and worst scenarios, with multiple cables strung together, and with whatever module is on the other end of the cable. For example a connector standard might be designed to assure the communication link would work with two FO modules connected in a variety of configurations. The worse case configuration might be with a dim transmitter (barely meeting spec), a long link (hundreds of meters), many cables strung together end-to-end, and a receiver on the other end that barely meets the sensitivity spec. Every cable assembly and every module must be built with sufficient precision to meet this worse case scenario. On the other hand, in a particular application, the communication link might only be used over a distance of a few meters and with only one cable in the link. A design where the cable assembly is fixed to the FO module would free the manufactures to use piece parts that will work in this scenario without needing to make a more costly module and cable assembly that would work in every possible configuration.

In accordance with the invention, a single-use cable assembly designed for permanent attachment to a FO module is provided. Such a configuration makes it possible to reduce the cost of the cable assembly and the modules in the link. While the following discussion focuses mainly on the LC standard, the concept is generally applicable to other connector standards as well.

Figure 3:
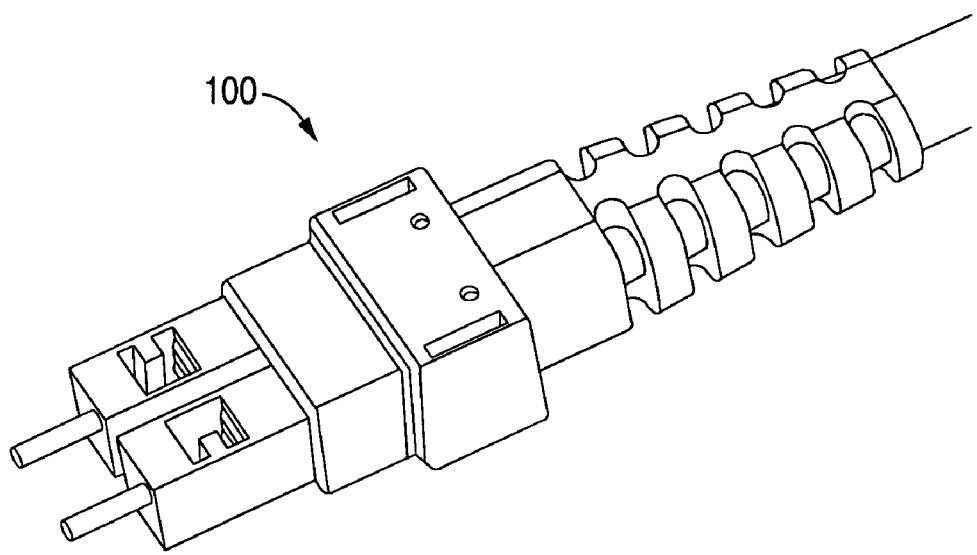
FIG. 3 illustrates a single-use fiber optic cable assembly in one embodiment of the invention.
Figure 4:
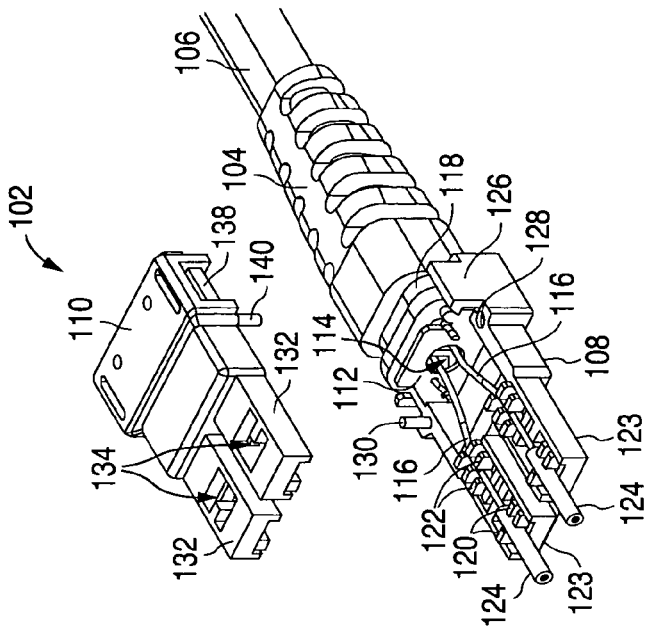
FIG. 4 illustrates an exploded view of the cable assembly of FIG. 3 in one embodiment of the invention.
Figure 4:
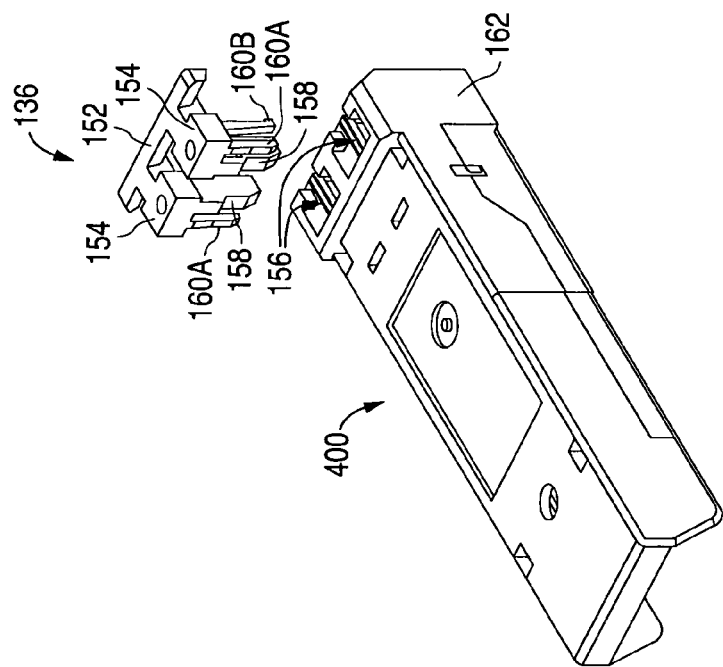

FIG. 3 illustrates a single-use fiber optic cable assembly 100 optimized for module-to-module communication in one embodiment of the invention. FIG. 4 illustrates an exploded view of cable assembly 100 to be inserted into a fiber optic module 400 in one embodiment of the invention. Cable assembly 100 consists of a connector body 102, a strain relief boot 104, and a fiber optic cable 106.

Connector body 102 consists of a lower housing 108 and an upper housing 110 mounted thereon. Lower housing 108 includes a bulkhead 112 with an opening 114. Opening 114 allows passage of two fibers 116 from cable 106. Behind bulkhead 112 resides a U-shaped cutout (not visible) for engaging a circumferential slot 118 on boot 104. Ahead of bulkhead 112 reside opposing tabs 120 and opposing tabs 122 (only some are labeled for clarity) inside two connector plugs 123. In each connector plug 123, opposing tabs 122 are spaced apart to receive one fiber 116 and opposing tabs 120 are spaced apart to receive one ferrule 124. Fiber 116 is inserted through ferrule 124 to protrude slightly from the ferrule tip. The ferrule tip need not be polished, either before or after assembly, to any specific physical contact profile specified a cable standard as cable assembly 100 is only used to interface with FO module 400. Depending on the application, fiber 116 can be a fiber with a larger diameter core or a plastic fiber not prescribed by the LC standard. Lower housing 108 further includes a cantilever latch 126, a mounting hole 128, and a mounting pin 130 for mating with upper housing 110.

Upper housing 110 includes two upper connector plugs 132 having cable keep receptacles 134. Receptacles 134 are provided to receive a cable keeper 136 that locks cable assembly 100 to FO module 400. For mating with lower housing 108, upper housing 110 includes a shoulder 138 for engaging cantilever latch 126, a mounting pin 140 for engaging alignment hole 128, a mounting hole for receiving alignment pin 130. Upper housing 110 further includes a U-shaped cutout for engaging circumferential slot 118 on boot 104.

Cable keeper 136 consists of a sprue 152 joined with two latching plugs 154. Latching plugs 154 fit inside latch openings 156 of FO module 400. Each latching plug 154 has a finger 158 and two opposing spring fingers 160A and 160B that can be inserted into cable keeper receptacles 134.

Figure 5:
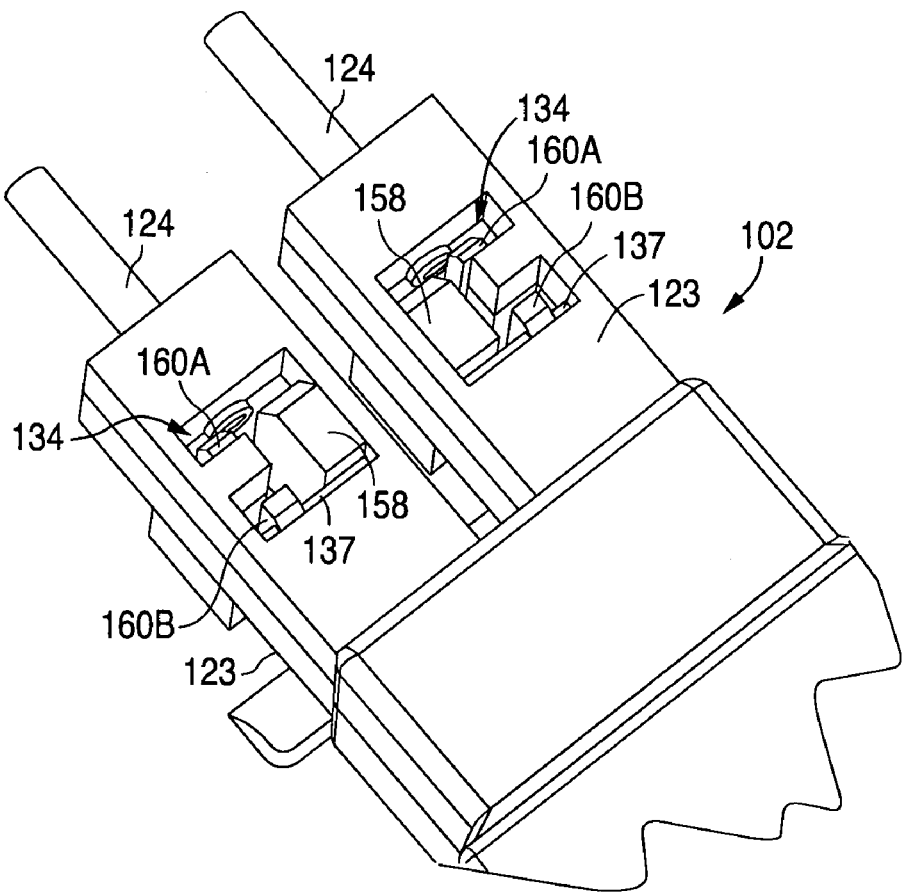
FIG. 5 illustrates a bottom view of a portion of the cable assembly of FIG. 3 in one embodiment of the invention.

FIG. 5 illustrates a bottom view of cable keeper 136 inserted into cable keeper receptacles 134 of connector 102. Cable keeper receptacles 134 include shoulders 137 that lock fingers 160B inside cable keeper receptacles 134. When inserted, fingers 160A spring-load ferrules 124 forward toward the light source or a detector inside FO module 400.

Cable assembly 100 can be assembled as follows in one embodiment of the invention. Cable 106 is threaded through boot 104. Cable 106 is then stripped of any jacket and buffer to expose fibers 116. Cable 106 and boot 104 are placed in lower housing 108, with circumferential slot 118 of boot 104 pressed into a U-shaped cutout of lower housing 108. An adhesive is injected into ferrules 124 and fibers 116 are inserted so they protrude from the ferrule tips. The protruding fibers 116 are then scribed and broken off with a scribe tool. Fibers 116 are not polished before or after assembly. Ferrules 124 are then seated between opposing tabs 120 while portions of fibers 116 are seated between opposing tabs 122. Upper housing 110 is aligned and mated with lower housing 108 to form connector body 102.

As cable assembly 100 is designed to be only attached to FO module 400 and not to another cable assembly, the ferrule tips with the protruding fibers 116 are not polished to conform to the LC standard. Furthermore, ferrules 124 do not need to have a PC surface that conforms to the LC standard. Thus, the cost of cable assembly 100 is reduced.

Figure 6:
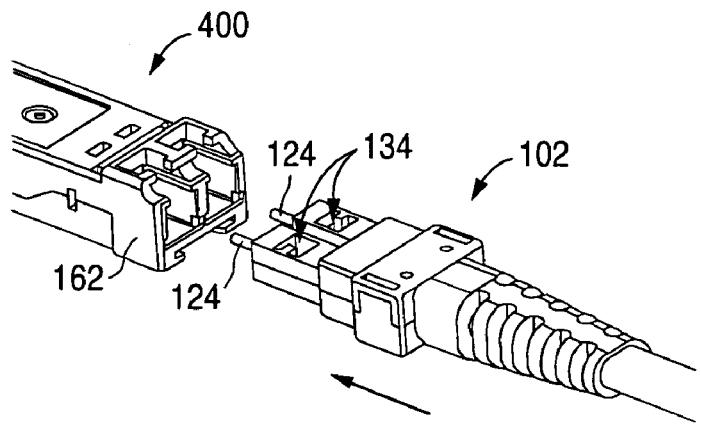
FIGS. 6, 7, and 8 illustrate how the cable assembly of FIG. 3 is connected to a fiber optic module in one embodiment of the invention.
Figure 7:
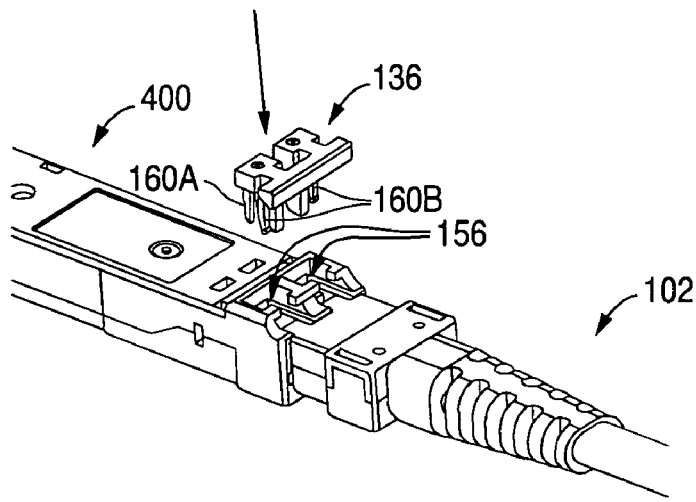
Figure 8:
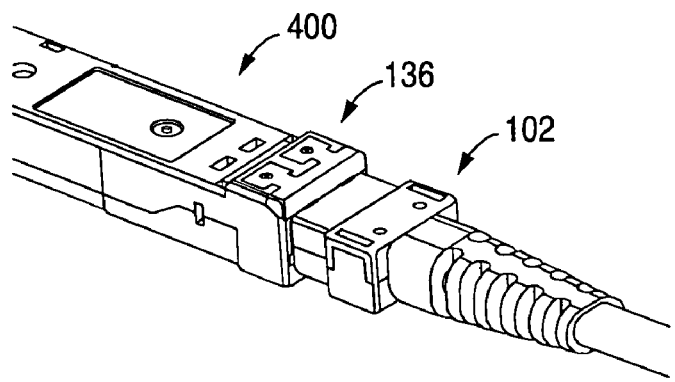

Cable assembly 100 is connected to FO module 400 as follows in one embodiment of the invention. As shown in FIG. 6, connector body 102 is inserted into a nose 162 of FO module 400. As shown in FIG. 7, cable keeper 136 is inserted through latching openings 156 and then through cable keeper receptacles 134 (FIGS. 4, 5, and 6) to lock connector body 102 to module 400. When fingers 160A bottom out in lower housing 108 (FIGS. 4 and 5), they push ferrules 124 (FIGS. 4, 5, and 6) forward. As shown in FIG. 8, cable assembly 100 is permanently attached to FO module 400.

Various other adaptations and combinations of features of the embodiments disclosed are within the scope of the invention. Numerous embodiments are encompassed by the following claims.

What is claimed is:

1. A fiber optic cable assembly to be inserted into a fiber optic module, comprising:
   a cable;
   a connector body receiving the cable, the connector body comprising a ferrule receiving a fiber from the cable, the fiber being permanently fixed to the ferrule, wherein a tip of the fiber protrudes unpolished from a tip of the ferrule; and
   a cable keeper to be inserted through a latch opening of the fiber optic module and into a cable keeper receptacle of the connector body to permanently connect the connector body and the fiber optic module.

2. The cable assembly of claim 1, wherein the connector body further comprises
   a lower housing comprising opposing tabs for receiving the ferrule;
   an upper housing defining the cable keeper receptacle, wherein the upper housing is mounted atop the lower housing.

3. The cable assembly of claim 2, wherein the cable keeper comprises a spring finger that, when inserted into the cable keeper receptacle, spring-loads the ferrule forward.

4. The cable assembly of claim 2, further comprising a strain relief boot around the cable and received within the connector body.

5. The cable assembly of claim 2, wherein the lower housing further comprises a cantilever latch, a first alignment hole, and a first alignment pin, and the upper housing further comprises a shoulder for engaging the cantilever latch, a second alignment pin for engaging the first alignment hole, and a second alignment hole for receiving the first alignment pin.

6. The cable assembly of claim 3, wherein the cable keeper receptacle further comprises a shoulder and the cable keeper further comprises another spring finger that, when inserted into the cable keeper receptacle, locks onto the shoulder.

7. The cable assembly of claim 1, wherein the cable keeper comprises a spring finger that, when inserted into the cable keeper receptacle, spring-loads the ferrule forward.

8. The cable assembly of claim 1, wherein the cable keeper receptacle comprises a shoulder and the cable keeper comprises a spring finger that when inserted into the cable keeper receptacle, locks onto the shoulder.

9. A method for forming a cable assembly to be inserted into a fiber optic module, comprising:
   stripping a cable to expose fiber;
   inserting the fiber into a ferrule so a portion of the fiber protrudes from a tip of the ferrule;
   bonding the fiber the ferrule;
   scribing and breaking the protruding portion of the fiber to form a tip of the fiber;
   mounting the ferrule in a lower housing;
   mounting an upper housing atop the lower housing to form a connector body; and
   inserting the cable assembly into the fiber optic module without polishing the tip of the fiber, wherein said inserting the cable assembly into the fiber optic module comprises:
      inserting the connector body into a nose of the fiber optic module; and
      inserting a cable keeper through a latch opening of the fiber optic module and into a cable keeper receptacle of the connector body to permanently connect the connector body and the fiber optic module.

10. The method of claim 9, wherein said mounting the ferrule in a lower housing comprises seating the ferrule into opposing tabs in the lower housing.

11. The method of claim 9, further comprising sliding a strain relief boot over the cable, mounting the strain relief boot along with the ferrule in the lower housing, and mounting the upper housing atop the lower housing to engage the strain relief boot.

12. The method of claim 9, wherein said mounting an upper housing atop the lower housing comprises:
   engaging a cantilever latch on the lower housing to a shoulder on the upper housing;
   inserting a first alignment pin of the lower housing into a first alignment hale of the upper housing; and
   inserting a second alignment pin of the upper housing into a second alignment hole of the lower housing.

13. The method of claim 9, wherein a spring finger of the cable keeper spring-loads the ferrule forward.

14. The method of claim 9, wherein a spring finger of the cable keeper locks onto a shoulder of the cable keeper receptacle.

* * * * *

UNITED STATES PATENT AND TRADEMARK OFFICE
CERTIFICATE OF CORRECTION

| | | |
|---|---|---|
| PATENT NO. | : 7,128,471 B2 | Page 1 of 1 |
| APPLICATION NO. | : 10/841579 | |
| DATED | : October 31, 2006 | |
| INVENTOR(S) | : Robert E. Wilson | |

It is certified that error appears in the above-identified patent and that said Letters Patent is hereby corrected as shown below:

Column 5, Line 6, Claim 8, after "that" insert -- , --;

Column 5, Line 10, Claim 9, after "expose" insert -- a --;

Column 5, Line 13, Claim 9, after "fiber" insert -- to --;

Column 6, Line 17, Claim 12, delete "hale" and insert -- hole --.

Signed and Sealed this

Eighth Day of June, 2010

David J. Kappos
*Director of the United States Patent and Trademark Office*